United States Patent
Bastani et al.

(10) Patent No.: US 11,651,570 B2
(45) Date of Patent: May 16, 2023

(54) ADAPTIVE RATE CONTROL FOR ARTIFICIAL REALITY

(71) Applicant: Meta Platforms Technologies, LLC, Menlo Park, CA (US)

(72) Inventors: Behnam Bastani, Palo Alto, CA (US); James Randal Hughes, Newark, CA (US); Reza Nourai, Danville, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 58 days.

(21) Appl. No.: 17/475,067

(22) Filed: Sep. 14, 2021

(65) Prior Publication Data
US 2021/0407212 A1    Dec. 30, 2021

Related U.S. Application Data

(63) Continuation of application No. 16/822,484, filed on Mar. 18, 2020, now Pat. No. 11,127,221.

(51) Int. Cl.
| | |
|---|---|
| G06T 19/00 | (2011.01) |
| G06T 19/20 | (2011.01) |
| G02B 27/00 | (2006.01) |
| G02B 27/01 | (2006.01) |

(52) U.S. Cl.
CPC ........ *G06T 19/006* (2013.01); *G02B 27/0093* (2013.01); *G02B 27/017* (2013.01); *G06T 19/20* (2013.01)

(58) Field of Classification Search
CPC ... G06T 19/006; G06T 19/20; G02B 27/0093; G02B 27/017

USPC ......................................................... 345/633
See application file for complete search history.

(56) References Cited

U.S. PATENT DOCUMENTS

| | | | |
|---|---|---|---|
| 2008/0166027 A1 | 7/2008 | Jeong et al. | |
| 2010/0188574 A1 | 7/2010 | Hung et al. | |
| 2018/0075798 A1* | 3/2018 | Nho | G09G 3/32 |
| 2018/0098083 A1 | 4/2018 | McAllister | |
| 2018/0262687 A1 | 9/2018 | Hildreth | |
| 2019/0189086 A1* | 6/2019 | Zhang | G09G 5/10 |
| 2019/0236834 A1* | 8/2019 | Blackmon | G06T 15/06 |
| 2019/0302883 A1* | 10/2019 | Greer | G06T 1/20 |
| 2020/0410740 A1 | 12/2020 | Croxford et al. | |

OTHER PUBLICATIONS

Notice of Allowance on U.S. Appl. No. 16/822,484 dated May 12, 2021.

* cited by examiner

*Primary Examiner* — Thomas J Lett
(74) *Attorney, Agent, or Firm* — Foley & Lardner LLP

(57) ABSTRACT

Disclosed herein are related to systems and methods for providing artificial reality. In one aspect, a console receives feedback information indicative of a first completion time from a head wearable display (HWD). The HWD may complete generating a first image frame at the first completion time. The HWD may display the first image frame. In one aspect, the console compares a display time, at which the first image frame is displayed by the HWD, and the first completion time. In one aspect, the console adjusts, according to the comparison, image processing, to adjust a second completion time, at which the console completes generating a second image frame. In one aspect, the console generates, via the adjusted image processing, the second image frame to provide to the HWD.

20 Claims, 7 Drawing Sheets

ADAPTIVE RATE CONTROL FOR ARTIFICIAL REALITY

CROSS-REFERENCE TO RELATED APPLICATION

This application is a continuation of U.S. patent application Ser. No. 16/822,484 filed on Mar. 18, 2020, which is incorporated by reference herein in its entirety for all purposes.

FIELD OF DISCLOSURE

The present disclosure is generally related to providing an artificial reality such as a virtual reality (VR), an augmented reality (AR) or a mixed reality (MR), including but not limited to adaptively adjusting a rate of performing one or more processes for rendering the artificial reality.

BACKGROUND

Artificial reality, such as a VR, AR, or MR, provides immersive experience to a user. In one example, a user wearing a head wearable display (HWD) can turn his head to one side, and an image of a virtual object corresponding to a location and/or an orientation of the HWD and a gaze direction of the user can be displayed on the HWD to allow the user to feel as if the user is moving within a space of an artificial reality (e.g., a VR space, an AR space, or a MR space).

In one implementation, an image of a virtual object is generated by a remote computing device communicatively coupled to the HWD, and the image is rendered by the HWD to conserve computational resources and/or achieve bandwidth efficiency. In one example, the HWD includes various sensors that detect a location and/or orientation of the HWD and a gaze direction of the user wearing the HWD, and transmits sensor measurements indicating the detected location and gaze direction to a console device (and/or a remote server, e.g., in the cloud) through a wired connection or a wireless connection. The console device can determine a user's view of the space of the artificial reality according to the sensor measurements, and generate an image of the space of the artificial reality corresponding to the user's view. The console device can transmit the generated image to the HWD, by which the image of the space of the artificial reality corresponding to the user's view can be presented to the user. In one aspect, the process of detecting the location of the HWD and the gaze direction of the user wearing the HWD, and rendering the image to the user should be performed within a frame time (e.g., less than 11 ms). Any latency between a movement of the user wearing the HWD and an image displayed corresponding to the user movement can cause judder, which may result in motion sickness and can degrade the user experience.

SUMMARY

Various embodiments disclosed herein are related to a method of presenting an artificial reality. In some embodiments, the method includes receiving, by a console from a head wearable display (HWD), feedback information indicative of a first completion time, at which the HWD completes generating a first image frame. The first image frame may be displayed by the HWD. In some embodiments, the method includes comparing, by the console, a display time, at which the first image frame is displayed by the HWD, and the first completion time. In some embodiments, the method includes adjusting, by the console according to the comparison, image processing at the console, to adjust a second completion time, at which the console completes generating a second image frame. In some embodiments, the method includes generating, by the console via the adjusted image processing, the second image frame to provide to the HWD.

In some embodiments, the method includes encoding, by the console, the first image frame to generate image data. In some embodiments, the method includes transmitting, by the console to the HWD, the image data. In some embodiments, the first completion time corresponds to a time, at which the HWD completes decoding the image data.

In some embodiments, adjusting the image processing includes determining, by the console, a third completion time, at which the HWD completes generating a third image frame according to the second image frame. The third image frame may be scheduled to be displayed by the HWD at another display time. The second completion time may be adjusted to cause the third completion time to occur within a predetermined range from the another display time.

In some embodiments, adjusting, by the console, the image processing includes adjusting the image processing to hasten the second completion time, in response to a difference between the display time and the first completion time being less than a first predetermined threshold. In some embodiments, adjusting, by the console, the image processing includes adjusting the image processing to delay the second completion time, in response to the difference between the display time and the first completion time being larger than a second predetermined threshold.

In some embodiments, generating, by the console via the adjusted image processing, the second image frame includes receiving, by the console from the HWD, sensor information indicating at least a location or an orientation of the HWD sensed. In some embodiments, generating, by the console via the adjusted image processing, the second image frame includes determining, by the console, a view of an artificial reality according to the sensor information. In some embodiments, generating, by the console via the adjusted image processing, the second image frame includes generating, by the console via the adjusted image processing, the second image frame of the determined view.

In some embodiments, the method includes receiving, by the console from the HWD, first sensor information indicating at least a first location or a first orientation of the HWD sensed at a first time between the first completion time and the adjusted second completion time. In some embodiments, the method includes determining, by the console, a first view of an artificial reality according to the first sensor information. In some embodiments, the method includes generating, by the console at a second time between the first time and the adjusted second completion time, a third image frame of the first view.

In some embodiments, generating, via the adjusted image processing, the second image frame includes receiving, by the console from the HWD, second sensor information indicating at least a second location or a second orientation of the HWD sensed at a third time between the second time and the adjusted second completion time. In some embodiments, generating, via the adjusted image processing, the second image frame includes determining, by the console, a second view of the artificial reality according to the second sensor information. In some embodiments, generating, via the adjusted image processing, the second image frame includes generating, by the console at the adjusted second completion time, the second image frame of the second view, according to a portion of the third image frame.

Various embodiments disclosed herein are related to a non-transitory computer readable medium storing instructions for presenting an artificial reality. In some embodiments, the instructions when executed by one or more processors cause the one or more processors to receive, from a head wearable display (HWD), feedback information indicative of a first completion time, at which the HWD completes generating a first image frame, the first image frame displayed by the HWD. In some embodiments, the instructions when executed by one or more processors cause the one or more processors to compare, a display time, at which the first image frame is displayed by the HWD, and the first completion time. In some embodiments, the instructions when executed by one or more processors cause the one or more processors to adjust, according to the comparison, image processing to adjust a second completion time at which the one or more processors complete generating a second image frame. In some embodiments, the instructions when executed by one or more processors cause the one or more processors to generate, via the adjusted image processing, the second image frame to provide to the HWD.

In some embodiments, the non-transitory computer readable medium further stores instructions when executed by one or more processors cause the one or more processors to encode the first image frame to generate image data, and transmit to the HWD, the image data. In some embodiments, the first completion time corresponds to a time, at which the HWD completes decoding the image data.

In some embodiments, the instructions when executed by the one or more processors cause the one or more processors to adjust the image processing by determining a third completion time, at which the HWD completes generating a third image frame according to the second image frame. The third image frame may be scheduled to be displayed by the HWD at another display time. The second completion may be adjusted to cause the third completion time to occur within a predetermined range from the another display time.

In some embodiments, the instructions when executed by the one or more processors cause the one or more processors to adjust the image processing hastening the second completion time, in response to a difference between the display time and the first completion time being less than a first predetermined threshold. In some embodiments, the instructions when executed by the one or more processors cause the one or more processors to adjust the image processing by delaying the second completion time, in response to the difference between the display time and the first completion time being larger than a second predetermined threshold.

In some embodiments, the instructions when executed by the one or more processors cause the one or more processors to generate the second image frame by receiving, from the HWD, sensor information indicating at least a location or an orientation of the HWD sensed. In some embodiments, the instructions when executed by the one or more processors cause the one or more processors to generate the second image frame by determining a view of an artificial reality according to the sensor information. In some embodiments, the instructions when executed by the one or more processors cause the one or more processors to generate the second image frame by generating, via the adjusted image processing, the second image frame of the determined view.

In some embodiments, the non-transitory computer readable medium further stores instructions when executed by one or more processors cause the one or more processors to receive, from the HWD, first sensor information indicating at least a first location or a first orientation of the HWD sensed at a first time between the first completion time and the adjusted second completion time. In some embodiments, the non-transitory computer readable medium further stores instructions when executed by one or more processors cause the one or more processors to determine a first view of an artificial reality according to the first sensor information. In some embodiments, the non-transitory computer readable medium further stores instructions when executed by one or more processors cause the one or more processors to generate, at a second time between the first time and the adjusted second completion time, a third image frame of the first view.

In some embodiments, the instructions when executed by the one or more processors, cause the one or more processors to generate the second image frame by receiving, from the HWD, second sensor information indicating at least a second location or a second orientation of the HWD sensed at a third time between the second time and the adjusted second completion time. In some embodiments, the instructions when executed by the one or more processors, cause the one or more processors to generate the second image frame by determining a second view of the artificial reality according to the second sensor information. In some embodiments, the instructions when executed by the one or more processors, cause the one or more processors to generate the second image frame by generating at the adjusted second completion time, the second image frame of the second view, according to a portion of the third image frame.

Various embodiments, disclosed herein are related to a method of presenting an artificial reality. In some embodiments, the method includes transmitting, by a head wearable display (HWD) to a console, feedback information indicative of a first completion time, at which the HWD completes generating a first image frame, the first image frame displayed by the HWD. In some embodiments, the method includes receiving, by the HWD from the console, image data corresponding to a second image frame for display by the HWD at a display time. In some embodiments, the method includes generating, by the HWD, sensor information indicating at least a location or an orientation of the HWD at a first time between the first completion time and the display time. In some embodiments, the method includes generating, by the HWD, a third image frame of a view of an artificial reality corresponding to the sensor information, according to a portion of the second image frame.

In some embodiments, the method includes determining, by the HWD, a second completion time, at which generating the third image frame is completed. In some embodiments, the method includes comparing, by the HWD, the second completion time and the display time. In some embodiments, the method includes transmitting, by the HWD to the console, additional feedback information indicating the second completion time, in response to a difference between the display time and the second completion time being less than a first predetermined threshold or larger than a second predetermined threshold.

In some embodiments, the method includes decoding the image data to obtain the second image frame. The second completion time may correspond to a time, at which the HWD completes decoding the image data. In some embodiments, the method includes transmitting, by the HWD to the console, different sensor information indicating at least a location or an orientation of the HWD at a second time between the first completion time and the first time, the different sensor information causing the console to generate the second image frame of a different view of the artificial reality corresponding to the different sensor information.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
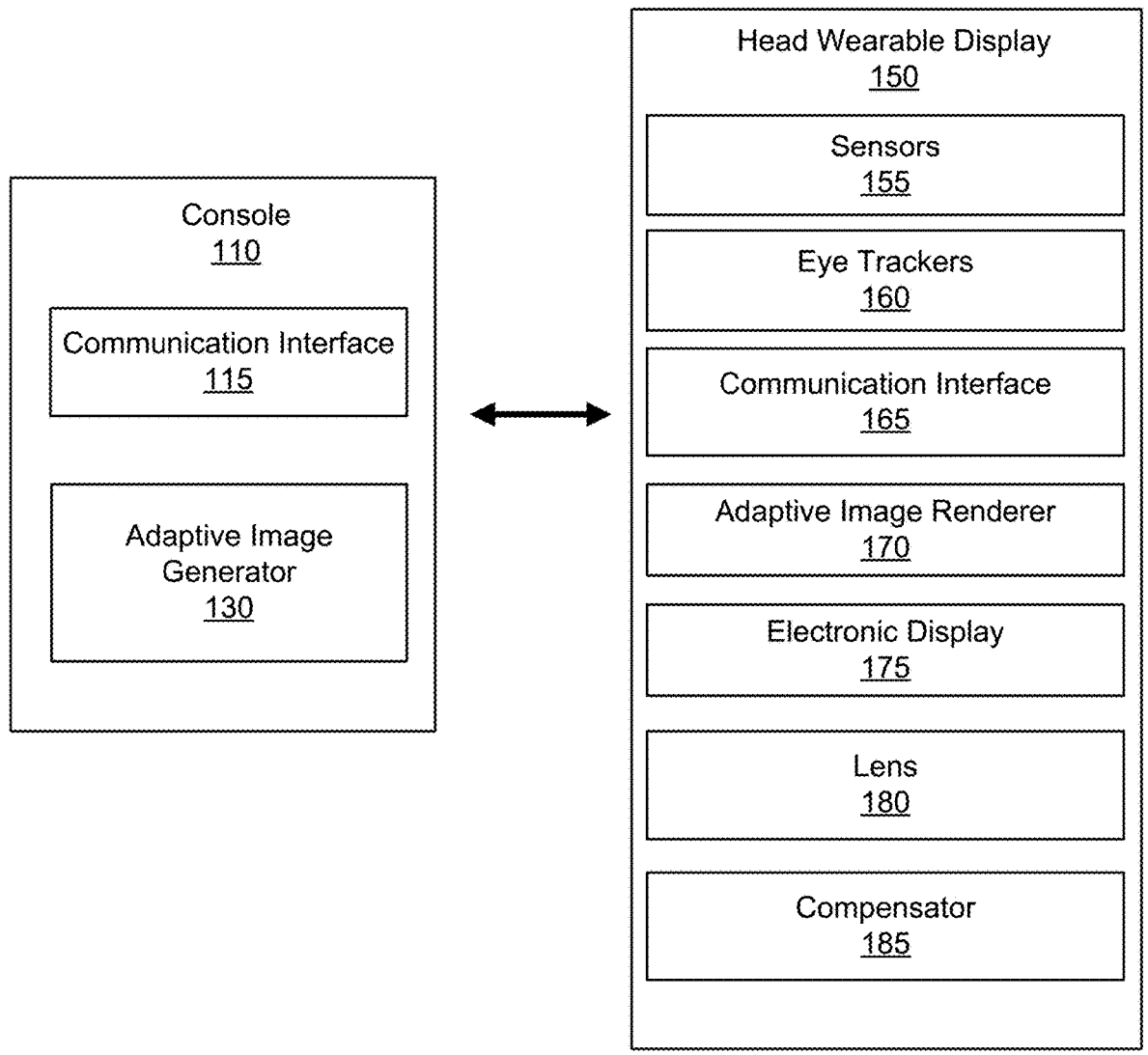
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are related to systems and methods for presenting artificial reality via an adaptive rate control. In one aspect, a console receives, from a head wearable display (HWD), feedback information indicative of a first completion time, at which the HWD may complete generating a first image frame. The HWD may display the first image frame. In one aspect, the console compares i) a display time, at which the first image frame is displayed by the HWD, and ii) the first completion time. According to the comparison, the console may adjust, an image processing (e.g., time warp processing and/or reprojection), to adjust a second completion time, at which the console completes generating a second image frame. In one aspect, the console generates, via the adjusted image processing, the second image frame, and transmits the second image frame to the HWD. The HWD may receive the second image frame, and can perform an additional image processing (e.g., time warp processing or reprojection) on the second image frame to generate a third image frame at a third completion time. The HWD may present the third image frame at another display time. In one aspect, the console adjusts the image processing according to the feedback information, such that the third image frame is generated by the HWD at the third completion time within a predetermined time range from the another display time.

Advantageously, the console can adaptively adjust its processing (e.g., time warp processing and/or reprojection) in a manner that the HWD can generate an image frame at a completion time close (e.g., within 1 ms) to a display time, at which the image frame is displayed. For example, each image frame is displayed at a predetermined time (e.g., every 11 ms). In one aspect, generating sensor measurements indicating a location and/or an orientation of the HWD, and/or a gaze direction of the user of the HWD, and generating an image of a view of an artificial reality corresponding to the sensor measurements can consume a large amount of computational resources. Any latency between a movement of the user wearing the HWD and an image displayed corresponding to the user movement can cause judder, which may result in motion sickness and can degrade the user experience. In one or more embodiments disclosed herein, image processing (e.g., time warp processing and/or reprojection) can be performed to reuse a portion of a previous image frame, where the console can adaptively adjust the image processing according to feedback information from the HWD. For example, according to the feedback information indicating the first completion time, the console can adjust image processing performed on the first image frame to complete generating the second image frame at the second completion time, which allows or causes the HWD to generate the third image frame for display according to updated sensor measurements at the third completion time within a predetermined time range (e.g., 1 ms) from the another display time. Hence, a latency between the movement of the user and the image displayed corresponding to the user movement can be adaptively adjusted. Moreover, a number of image frames dropped or not displayed can be reduced, and a seamless AR experience can be provided to the user.

FIG. 1 is a block diagram of an example artificial reality system environment 100 in which a console 110 operates. In some embodiments, the artificial reality system environment 100 includes a HWD 150 worn by a user, and a console 110 providing content of artificial reality to the HWD 150. The console 110 may be a computing device or a remote (cloud) server operating in conjunction with a computing device. A head wearable display (HWD) may be referred to as, include, or be part of a head mounted display (HMD), head mounted device (HMD), head wearable device (HWD), head worn display (HWD) or head worn device (HWD). In one aspect, the HWD 150 may detect its location and/or orientation, and a gaze direction of the user wearing the HWD 150, and provide the detected location and/or orientation, and the gaze direction to the console 110. The console 110 may determine a view within the space of the artificial reality corresponding to the detected location and/or orientation and the gaze direction, and generate an image depicting the determined view. The console 110 may provide the image to the HWD 150 for rendering. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150. For example, some of the functionality of the HWD 150 may be performed by the console 110. In some embodiments, the console 110 is integrated as part of the HWD 150.

In some embodiments, the HWD 150 is an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, eye trackers 160, a communication interface 165, an adaptive image renderer 170, an electronic display 175, a lens 180, and a compensator 185. These components may operate together to detect a location and an orientation of the HWD 150 and/or a gaze direction of the user wearing the HWD 150, and render an image of a view within the artificial reality corresponding to the detected location and orientation of the HWD 150 and/or the gaze direction of the user. In other embodiments, the HWD 150 includes more, fewer, or different components than shown in FIG. 1.

In some embodiments, the sensors 155 include electronic components or a combination of electronic components and software components that detect a location and an orientation of the HWD 150. Examples of sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and/or the rotational movement, and determine an orientation and/or location of the HWD 150. In one aspect, the sensors 155 can detect the translational movement and the rotational movement with respect to a previous orientation and/or location of the HWD 150, and determine a new orientation and location of the HWD 150 by accumulating or integrating the detected translational movement and/or the rotational movement. Assuming for example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the eye trackers 160 include electronic components or a combination of electronic components and software components that determine a gaze direction of the user of the HWD 150. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers 160 incorporate the orientation of the HWD 150 and the relative gaze direction with respect to the HWD 150 to determine a gate direction of the user. Assuming for example that the HWD 150 is oriented at a direction 30 degrees from a reference direction, and the relative gaze direction of the HWD 150 is −10 degrees (or 350 degrees) with respect to the HWD 150, the eye trackers 160 may determine that the gaze direction of the user is 20 degrees from the reference direction. In some embodiments, a user of the HWD 150 can configure the HWD 150 (e.g., via user settings) to enable or disable the eye trackers 160. In some embodiments, a user of the HWD 150 is prompted to enable or disable the eye trackers 160.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link, a wired link, or both. Examples of the wireless link can include a cellular communication link, a near field communication link, Wi-Fi, Bluetooth, or any communication wireless communication link. Examples of the wired link can include a USB, Ethernet, Firewire, HDMI, or any wired communication link. In the embodiments, in which the console 110 and the head wearable display 150 are implemented on a single system, the communication interface 165 may communicate with the console 110 through a bus connection or a conductive trace. Through the communication link, the communication interface 165 may transmit to the console 110 data (e.g., sensor measurements) indicating the determined location of the HWD 150 and the determined gaze direction of the user. In addition, through the communication link, the communication interface 165 may transmit to the console 110 any feedback information. Moreover, through the communication link, the communication interface 165 may receive from the console 110 image data indicating image to be rendered.

In some embodiments, the adaptive image renderer 170 includes an electronic component or a combination of an electronic component and a software component that generates one or more images for display, for example, according to a change in view of the artificial reality. In some embodiments, the adaptive image renderer 170 is implemented as a processor (or a graphical processing unit (GPU)) that executes instructions to perform various functions described herein. The adaptive image renderer 170 may receive, through the communication interface 165, image data describing an image to be rendered, and render the image through the electronic display 175. In some embodiments, the data from the console 110 may be compressed and/or encoded, and the adaptive image renderer 170 may decompress and/or decode the image data to generate and render the image. In one aspect, the process of detecting, by the HWD 150, the location and the orientation of the HWD 150 and/or the gaze direction of the user wearing the HWD 150, and generating and transmitting, by the console 110, a high resolution image (e.g., 1920 by 1080 pixels) corresponding to the detected location and the gaze direction to the HWD 150 may be computationally exhaustive and may not be performed within a frame time (e.g., less than 11 ms). In one aspect, the adaptive image renderer 170 generates an image frame through an image processing (e.g., a time warp processing and/or a reprojection) performed on an image frame from the console 110 to generate an updated image frame corresponding to updated sensor measurements. For example, the time warp process and/or the reprojection may be performed on the image frame to reuse a portion of the image frame to generate the updated image frame of a view of the artificial reality corresponding to the updated sensor measurements. Hence, a communication bandwidth between the console 110 and the HWD 150 can be reduced, and a high resolution image can be presented to the user without sacrificing fidelity.

In some embodiments, the adaptive image renderer 170 generates feedback information indicating a completion time, at which image processing (e.g., time warp and/or a reprojection) is completed, and/or a decoding time, at which decoding of the image data is completed, and provide the feedback information to the console 110 through the communication interface 165. In one aspect, the feedback information provided to the console 110 causes the console 110 to adjust the timing of generating image data of an image frame. Such adjusted timing causes or allows the adaptive image renderer 170 to decode the image data to obtain an image frame, and perform image processing (e.g., time warp and/or reprojection) on the image frame according to updated sensor measurements to generate the updated image frame at a completion time close (e.g., within 1 ms) to the display time, at which the updated image frame is displayed. Hence, a latency between the movement of the user and the image displayed corresponding to the user movement can be adaptively adjusted. Detailed description on configurations and operations of the adaptive image renderer 170 are provided below with respect to FIGS. 4 through 7.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes, for example through a lens, according to image generated by the adaptive image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the adaptive image renderer 170 to compensate for the distortions caused by the lens 180, and apply the determined compensation to the image from the adaptive image renderer 170. The compensator 185 may provide the predistorted image to the electronic display 175.

In some embodiments, the console 110 is an electronic component or a combination of an electronic component and a software component that provides content to be rendered to the HWD 150. In one aspect, the console 110 includes a communication interface 115 and an adaptive image generator 130. These components may operate together to determine a view of the artificial reality corresponding to the location of the HWD 150 and the gaze direction of the user of the HWD 150, and can generate an image of the artificial reality corresponding to the determined view. In other embodiments, the console 110 includes more, fewer, or different components than shown in FIG. 1. In some embodiments, the console 110 is integrated as part of the HWD 150.

In some embodiments, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link. Through the communication link, the communication interface 115 may receive from the HWD 150 data (e.g., sensor measurements) indicating the determined location and orientation of the HWD 150 and/or the determined gaze direction of the user. Moreover, through the communication link, the communication interface 115 may transmit to the HWD 150 image data describing an image to be rendered. In addition, through the communication link, the communication interface 115 may receive feedback information from the HWD 150.

The adaptive image generator 130 corresponds to or includes a component that generates content to be rendered according to the location and orientation of the HWD 150 and/or the gaze direction of the user of the HWD 150. In one aspect, the adaptive image generator 130 determines a view of the artificial reality according to the location and orientation of the HWD 150 and/or the gaze direction of the user of the HWD 150. For example, the adaptive image generator 130 maps the location of the HWD 150 in a physical space to a location within a virtual space, and determines a view of the virtual space along a direction corresponding to the orientation of the HWD 150 and the gaze direction of the user from the mapped location in the virtual space. The adaptive image generator 130 may generate an image frame describing an image of the determined view of the virtual space, and can transmit the image frame to the HWD 150 through the communication interface 115. The adaptive image generator 130 may compress and/or encode the image frame to generate an image data encoding the image frame, and can transmit the compressed and/or encoded image data to the HWD 150.

In some embodiments, the adaptive image generator 130 receives feedback information from the HWD 150, and can adaptively generate the image data according to the feedback information. In one aspect, the feedback information indicates a completion time, at which the image frame is generated by the HWD 150 for display. The adaptive image generator 130 may determine whether the completion time is within a predetermined range from a display time, at which the image frame displayed by the HWD 150. According to the comparison, the adaptive image generator 130 may generate image data for another image frame. For example, if the completion time is not within a predetermined range from the display time, the adaptive image generator 130 may determine an amount of time to delay or expedite (or hasten) the completion time to allow the adjusted completion time to be within the predetermined range from the display time. Then, the adaptive image generator 130 may adjust an image processing performed according to the determined amount of time to delay or expedite (or hasten) to generate another image frame, and encode the image frame to generate the image data. In one aspect, the adjusted image processing by the adaptive image generator 130 causes or allows the HWD 150 to receive the image data and generate an image frame based on the image data at another completion time via additional or extended image processing (e.g., time warp processing and/or reprojection) within a predetermined range from another display time. Hence, a latency between the movement of the user and the image displayed corresponding to the user movement can be adaptively adjusted. Detailed description on configurations and operations of the adaptive image generator 130 are provided below with respect to FIGS. 3 and 5 through 7.

Figure 2:
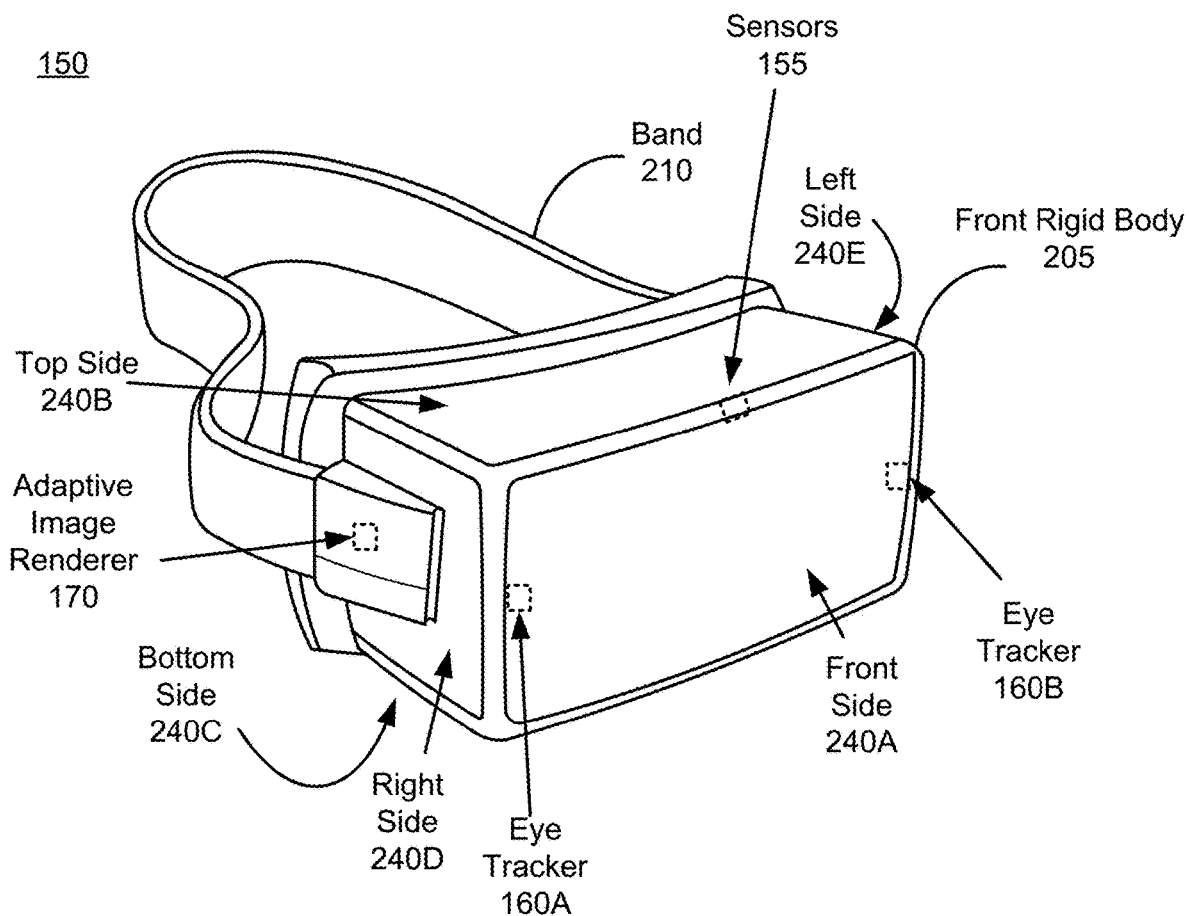
FIG. 2 is a diagram of a head wearable display, according to an example implementation of the present disclosure.

FIG. 2 is a diagram of the HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, and the adaptive image renderer 170. In the embodiment shown by FIG. 2, the sensors 155 are located within the front rigid body 205, and the sensors 155 are not visible to the user. In other embodiments, the HWD 150 has a different configuration than shown in FIG. 2. For example, the adaptive image renderer 170, the eye trackers 160A, 160B, and/or the sensors 155 may be in different locations than shown in FIG. 2.

Figure 3:
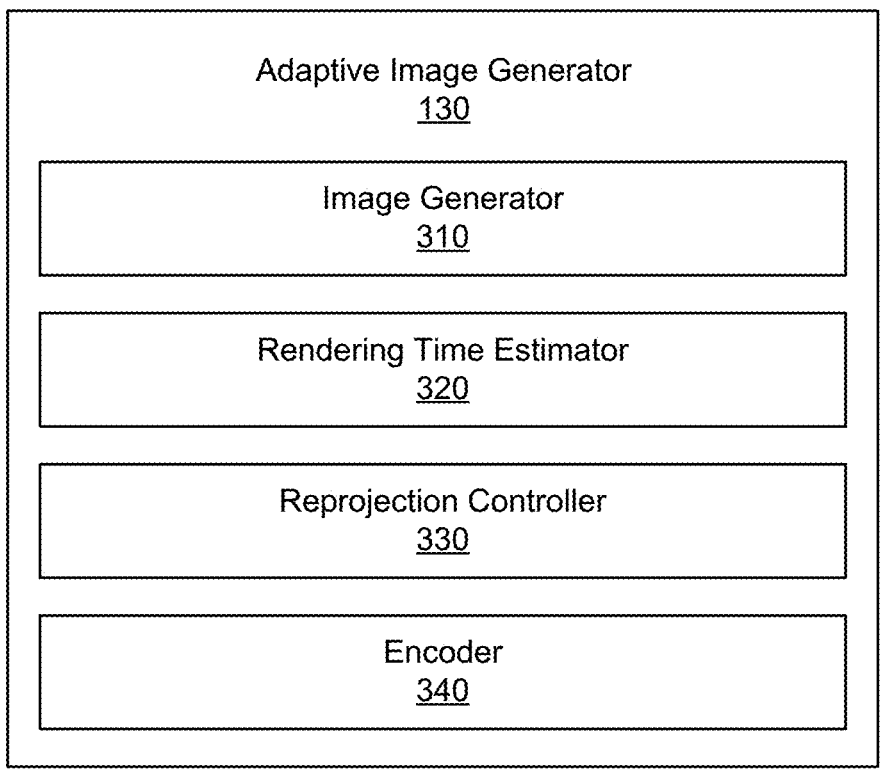
FIG. 3 is a diagram of an adaptive image generator, according to an example implementation of the present disclosure.

FIG. 3 is a diagram of the adaptive image generator 130, according to an example implementation of the present disclosure. In some embodiments, the adaptive image generator 130 includes an image generator 310, a rendering time estimator 320, a reprojection controller 330, and an encoder 340. These components may operate together to receive feedback information from the HWD 150, and can adaptively generate image data that causes or allows the HWD 150 to generate an image frame for display at a completion time close (e.g., within 1 ms) to a display time, at which the image frame is displayed. In some embodiments, the adaptive image generator 130 includes more, fewer, or different components than shown in FIG. 3.

In some embodiments, the image generator 310 corresponds to or includes a component that generates an image frame. In one configuration, the image generator 310 is embodied as a processor (e.g., a central processing unit (CPU), a graphics processing unit (GPU), application specific integrated circuit (ASIC), or a combination of them), software, a firmware, or a combination of them. In one approach, the image generator 310 receives sensor measurements indicating a location and an orientation of the HWD 150, and/or a gaze direction of a user through the communication interface 115. According to the sensor measurements, the image generator 310 determines a view of the artificial reality corresponding to the location and the orientation of the HWD 150, and/or the gaze direction of the user. For example, the image generator 310 maps the location of the HWD 150 in a physical space to a location within a virtual space, and determines a view of the virtual space along a direction corresponding to the orientation of the HWD 150 and the gaze direction of the user from the mapped location in the virtual space. The image generator 310 may generate an image frame of the determined view of the artificial reality.

In some embodiments, the rendering time estimator 320 corresponds to or includes a component that determines, predicts, or estimates a completion time, at which the HWD 150 can complete generating an image frame for display, according to feedback information from the HWD 150. In one aspect, the feedback information indicates a completion time, at which the HWD 150 completed generating a previous image frame for display. The rendering time estimator 320 may compare i) the completion time, at which the HWD 150 completed generating the previous image frame, and ii) the display time, at which the previous image frame is displayed. The display time may occur periodically (e.g., every 11 ms). The rendering time estimator 320 may synchronize a clock domain (e.g., VSYNC pulses) with the HWD 150 to determine or predict the display time. According to the comparison, the rendering time estimator 320 may determine an amount of time to delay or expedite (or hasten) the completion time for the HWD 150 to complete generating the subsequent image frame for display. For example, in response to a difference between the display time and the completion time for generating the previous image frame being less than a first predetermined threshold (e.g., 0.5 ms), such previous image frame may not have been successfully displayed by the HWD 150. In this example, the rendering time estimator 320 may determine to expedite (or hasten) the completion time for the HWD 150 to complete generating the subsequent image frame, such that the subsequent image frame can be generated and displayed at the subsequent display time successfully. For another example, in response to a difference between the display time and the completion time for generating the previous image frame being larger than a second predetermined threshold (e.g., 1.5 ms), such previous image frame may have been generated too soon, and a difference between the previous image frame and an anticipated image frame at the display time according to the user movement may be noticeable. In this example, the rendering time estimator 320 may determine to delay the completion time for the HWD 150 to complete generating the subsequent image frame, such that the subsequent image frame can be generated according to the updated sensor measurements obtained at a time close to or within a predetermined range from the display time. In some embodiments, the rendering time estimator 320 determines or adjusts the amount of time to delay or expedite (or hasten) the completion time for the HWD 150 to complete generating the subsequent image frame for display, according to parameters or types of reprojections performed by the console 110 and/or the HWD 150. For example, an amount of time consumed or allocated for the reprojections performed by the console 110 and/or the HWD 150 may change according to the one or more parameters or types of reprojections. According to the amount of time allocated for the reprojections, the rendering time estimator 320 may determine or adjust the amount of time to delay or expedite (or hasten) the completion time for the HWD 150.

In some embodiments, the reprojection controller 330 corresponds to or includes a component that performs image processing (e.g., time warp processing and/or reprojection) on an image frame to generate an updated image frame according to updated sensor measurements. In one aspect, the reprojection controller 330 receives the updated sensor measurements from the HWD 150 through the communication interface 115, and determines an updated view of the artificial reality corresponding to the updated sensor measurements. Moreover, the reprojection controller 330 determines a difference in the updated view and the view of the artificial reality depicted in the image frame. The reprojection controller 330 may generate a portion of the updated image frame corresponding to a portion of the updated view not included in the view of the artificial reality depicted in the image frame. The reprojection controller 330 may reuse a portion of the image frame corresponding to a common portion between the updated view and the view of the artificial reality. The reprojection controller 330 may combine the generated portion and the reused portion to generate the updated image frame. In one aspect, generating a high resolution image (e.g., 1920 by 1080 pixels or higher) based on sensor measurements is computationally expensive and may consume a long time (e.g., 11-20 ms). By reusing a portion of an image frame through a reprojection to generate an updated image frame, computational resources can be conserved and a high resolution image frame corresponding to updated sensor measurements can be generated in a prompt manner (e.g., 1-2 ms). In one aspect, the reprojection controller 330 performs reprojection at a time determined by the reprojection controller 330. In one approach, the reprojection controller 330 expedites or delays a start time and/or a completion of the reprojection (e.g., to expedite or delay frame processing/completion), according to an instruction from the rendering time estimator 320. In some embodiments, the reprojection process can change or vary according to a display setting or a configuration of the electronic display 175. For example, a display setting of the electronic display 175 may change between a global illumination of the entire display screen of the electronic display 175 or a sequential illumination per row or per portion of the display screen of the electronic display 175. Such setting may be selected according to a user selection, or automatically changed according to content (e.g., resolution, a range of colors, a range of luminance, a type of content, etc.) being presented, and/or a foveated area. In some embodiments, according to the display setting indicated by the feedback information, the reprojection controller 330 may adjust the reprojection process accordingly.

In some embodiments, the encoder 340 includes or corresponds to a component that encodes the image frame to generate image data. The encoder 340 may provide the encoded data to the communication interface 115 for transmission. In one approach, the encoder 340 can divide the image frame into two or more portions, and can encode the divided portions separately. In one approach, the encoder 340 can encode different portions and the communication interface 115 can transmit the encoded data for the different portions in a pipeline configuration. For example, a portion of the image frame may be encoded, while encoded data of another portion of the image frame can be transmitted through the communication interface 115. Accordingly, time for encoding an image frame to generate image data and transmitting the image data can be reduced.

Figure 4:
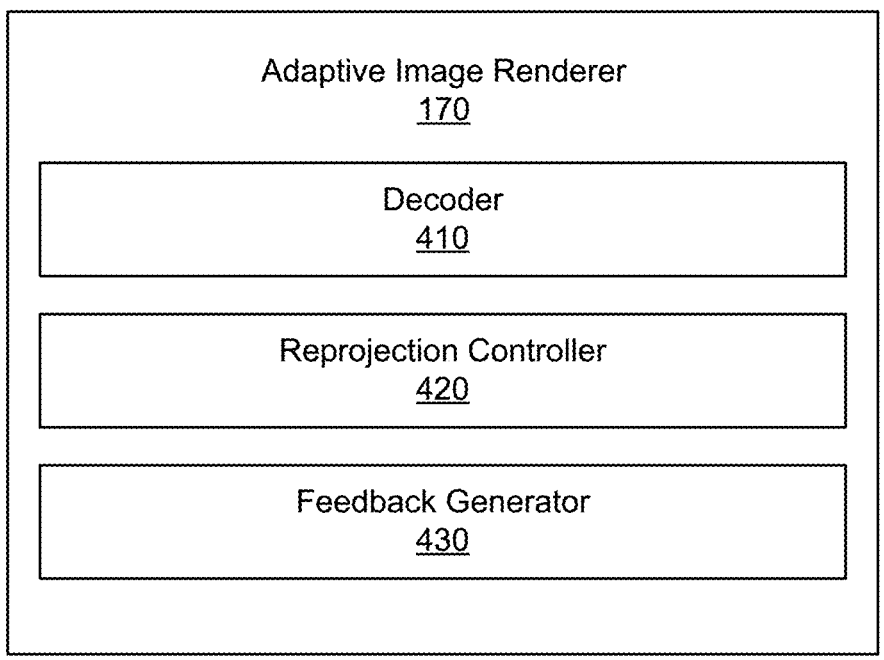
FIG. 4 is a diagram of an adaptive image renderer, according to an example implementation of the present disclosure.

FIG. 4 is a diagram of the adaptive image renderer 170, according to an example implementation of the present disclosure. In some embodiments, the adaptive image renderer 170 includes a decoder 410, a reprojection controller 420, and a feedback generator 430. These components may operate together to receive image data from the console 110, and can generate an image frame for display according to the image data. In some embodiments, the adaptive image renderer 170 includes more, fewer, or different components than shown in FIG. 4.

In some embodiments, the decoder 410 includes or corresponds to a component that receives image data from the console 110 through the communication interface 165, and performs decoding on the image data to obtain an image frame. In one approach, the decoder 410 receives image data for different portions of an image frame, and can decode the image data for the different portions in a pipeline configuration. The decoder 410 may combine the decoded portions to obtain the image frame, and can provide the image frame to the reprojection controller 420.

In some embodiments, the reprojection controller 420 includes or corresponds to a component that performs image processing (e.g., time warp processing and/or reprojection) on an image frame from the decoder 410 to generate an updated image frame according to updated sensor measurements. In one aspect, the reprojection controller 420 is similar to the reprojection controller 330 of the adaptive image generator 130, except that the reprojection controller 420 generates an update image frame for display according to an image frame from the decoder 410 and/or updated sensor measurements from the sensors 155. Thus, detailed description of duplicated portion thereof is omitted herein for the sake of brevity. The reprojection controller 420 may provide the updated image frame to the electronic display 175 or the compensator 185 for display.

In some embodiments, the feedback generator 430 includes or corresponds to a component that generates feedback information. In one aspect, the feedback information includes information indicating a completion time, at which the reprojection controller 420 completes generating the image frame for display. Additionally or alternatively, the feedback information includes information indicating a decoding time, at which the decoder 410 completes decoding the image data. According to the feedback information, the console 110 can adjust its image processing (e.g., time warp processing or reprojection) that causes or allows the reprojection controller 420 to complete generating an image frame for display at a subsequent completion time within a predetermined time range (e.g., 0.5 ms to 1.5 ms) from the subsequent display time.

In one approach, the feedback generator 430 compares i) a completion time, at which the reprojection controller 420 completed generating an image frame for display, and ii) a display time, at which the electronic display 175 displays the image frame, and adaptively generates the feedback information according to the comparison. In one example, in response to a difference between the display time and the completion time being less than a first predetermined time (e.g., 0.5 ms) or being larger than a second predetermined time (e.g., 1.5 ms), the feedback generator 430 may determine that the image frame is not generated within a predetermined range from the display time and may generate the feedback information. In some embodiments, the feedback information indicates settings or configurations of reprojections. For example, the feedback information may indicate a display setting of the electronic display 175 (e.g., global illumination of the entire display screen of the electronic display 175 or a sequential illumination per row or per portion of the display screen of the electronic display 175). The feedback information can be transmitted to the console 110 through the communication interface 165. In one example, in response to the difference between the display time and the completion time being larger than a first predetermined time (e.g., 0.5 ms) or less than the second predetermined time (e.g., 1.5 ms), the feedback generator 430 may determine that the image frame is generated within the predetermined range from the display time and may not generate the feedback information.

Figure 5:
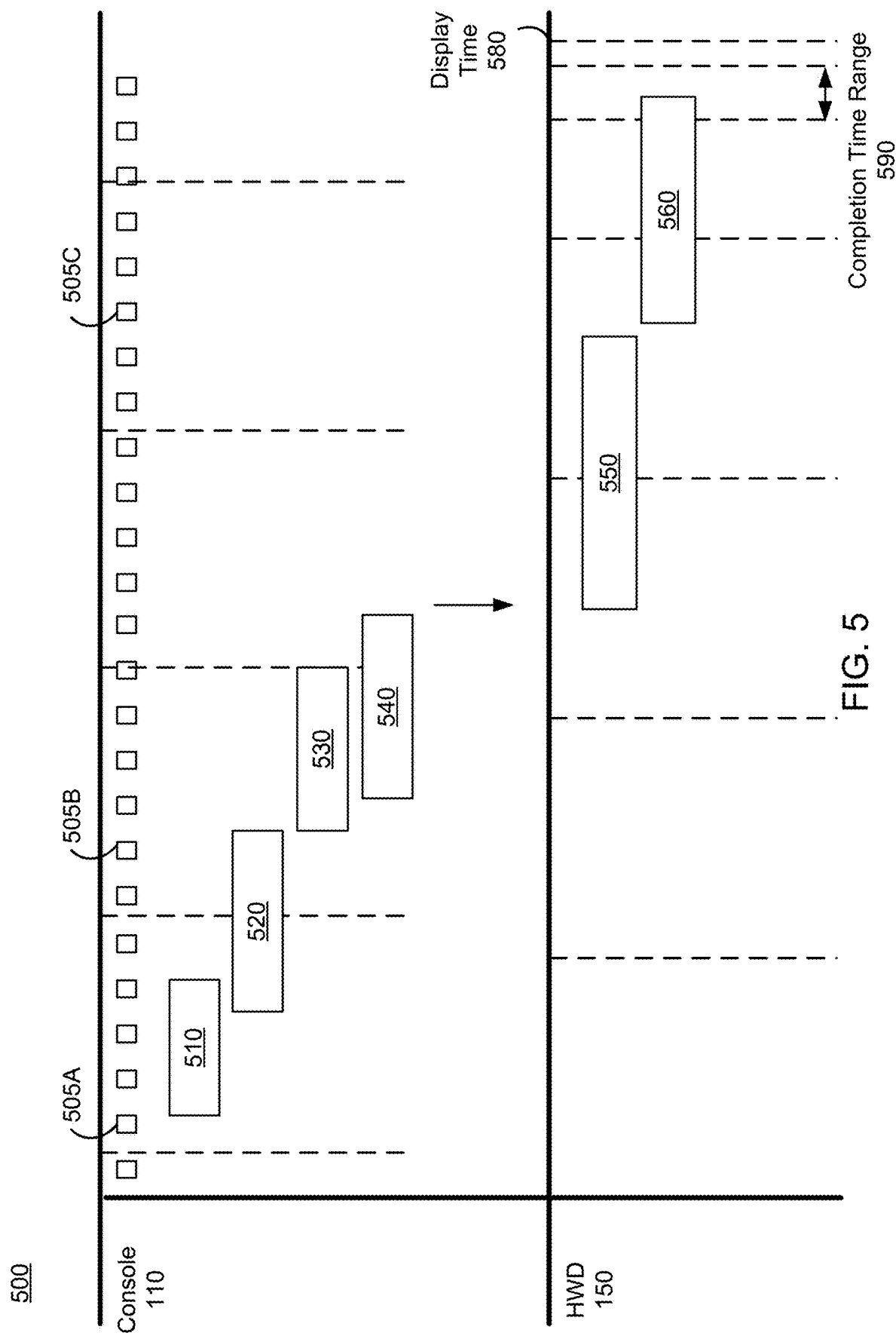
FIG. 5 is an example timing diagram of presenting an artificial reality via an adaptive rate control, according to an example implementation of the present disclosure.

FIG. 5 is an example timing diagram 500 of presenting an artificial reality via an adaptive rate control, according to an example implementation of the present disclosure. In one approach, the console 110 receives, from the HWD 150, multiple sensor measurements 505 each indicating a location and an orientation of the HWD 150 and/or a gaze direction of the user at a corresponding time. In one example, during a time period 510, the console 110 obtains the sensor measurements 505A, and determines a view of an artificial reality corresponding to the sensor measurements 505A. According to the determined view of the artificial reality, the console 110 may generate an image frame of the determined view during a time period 520. During a time period 530, according to sensor measurements 505B, the console 110 may perform an image processing (e.g., time warp processing or reprojection) on the image frame generated during the time period 520 to generate a first updated image frame. During a time period 540 after the time period 530 or partially overlapping the time period 530, the console 110 may encode the first updated image frame to generate image data and transmit the image data to the HWD 150. In one approach, the console 110 can encode portions of the first updated image frame, and transmit image data of the portions of the first updated image frame in a pipeline configuration.

In one approach, the HWD 150 receives the image data from the console 110, and decodes the image data to obtain the first updated image frame during a time period 550. In some embodiments, in response to unsuccessful/incomplete decoding or receiving of a portion of an encoded image frame from the console 110, the HWD 150 may generate or transmit a feedback information to request for the portion of the encoded image frame. Hence, the HWD 150 may receive and decode the portion of the encoded image frame, rather than the entire encoded image frame to reduce communication bandwidth and improve computational resources. In some embodiments, according to the sensor measurements 505C, the HWD 150 may perform an additional image processing (e.g., time warp processing and/or reprojection) on the first updated image frame obtained during the time period 550 to generate a second updated image frame during a time period 560. The HWD 150 may present the second update image frame at a display time 580.

In one approach, the HWD 150 determines whether the second updated image is generated within a completion time range 590 (e.g., 0.5 ms 1.5 ms) from the display time 580. In one example, if the second updated image is not generated with the completion time range 590 from the display time 580, the HWD 150 may generate feedback information and may transmit the feedback information to the console 110. The feedback information may indicate a completion time, at which the HWD 150 completed generating the second updated image frame. The feedback information may additionally indicate a decoding time, at which the HWD 150 completed decoding the image data. According to the feedback information, the HWD 150 may adjust an image processing, during a time period 530 for a subsequent image frame. For example, the console 110 can delay or expedite (or hasten) the start time and/or the completion time of generating the first updated image frame during the time period 530 for the subsequent image frame, such that the HWD 150 can receive the image data and perform an image processing (e.g., time warp processing or reprojection) to generate a second image frame for the subsequent image frame at a completion time within the completion time range 590 from the display time 580. In one approach, the console 110 may determine an offset between the completion time range 590 and the completion time 560 for the previous image frame, and delay or expedite the start time of the time period 530 for the subsequent image frame by an amount corresponding to the determined offset. Assuming for an example that the completion time range 590 is between 0.5 ms to 1.5 ms before the display time 580, in case the completion time of the time period 560 for the previous image frame is 2.2 ms before the display time 580, the console 110 may delay the start time of the time period 530 for the subsequent frame by an amount between 0.7 ms and 1.7 ms, such that the completion time of the time period 560 for generating the subsequent image frame can be within the completion time range 590 from the display time 580 for the subsequent image frame. Accordingly, a latency between the movement of the user and the image displayed corresponding to the user movement can be adaptively adjusted.

Figure 6A:
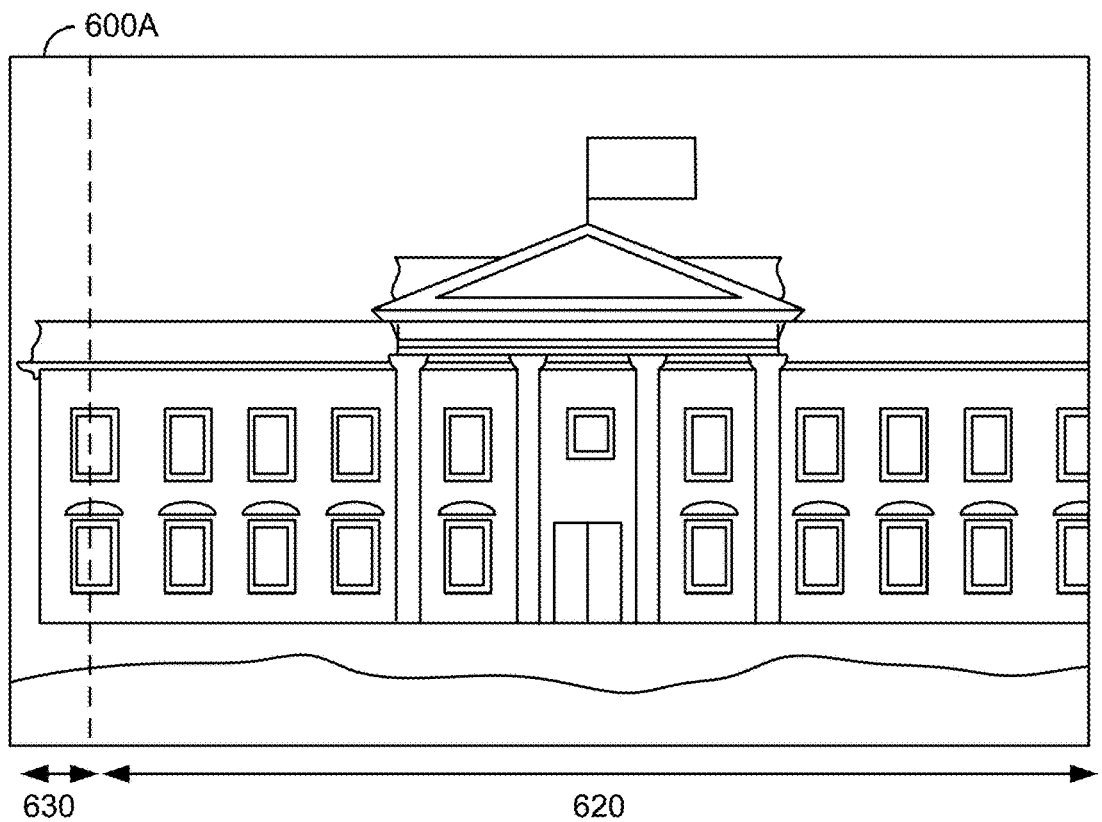
FIG. 6A is an example image of a first view of a virtual reality, according to an example implementation of the present disclosure.
Figure 6B:
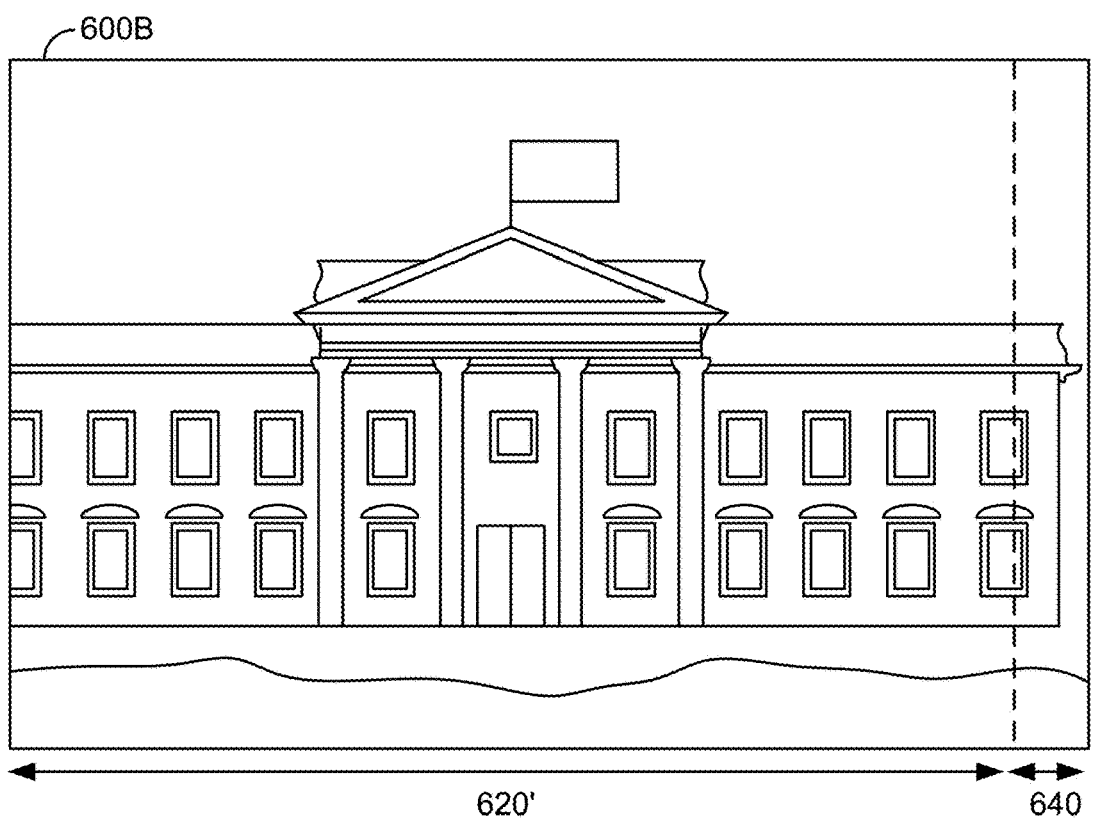
FIG. 6B is an example image of a second view of the virtual reality, according to an example implementation of the present disclosure.

FIG. 6A is an example image frame 600A of a first view of a virtual reality, and FIG. 6B is an example image frame 600B of a second view of the virtual reality, according to an example implementation of the present disclosure. For example, a user wearing a HWD 150 has rotated his head to the right, such that a view within the virtual reality changes according to the user movement. In this example, a portion 630 of the image frame 600A showing a left edge of a building is not included in the image frame 600B, and a portion 640 of the image frame 600B showing a right edge of the building not included in the image frame 600A is included in the image frame 600B. A portion 620 of the image frame 600A is also shown or included as a portion 620' in the image frame 600B. In one aspect, the image frame 600B of the virtual reality is presented to the user through a reprojection process. For example, the portion 620' of the image frame 600B is generated by performing reprojection on the portion 620 of the image frame 600A, where the portion 640 of the image frame 600B is newly generated. After the reprojection, the image frame 600B can be presented to the user through the HWD 150. By reusing the portion 620 of the image frame 600A through a reprojection to generate an updated image frame 600B, computational resources can be conserved and a high resolution image frame can be generated in a prompt manner by the reprojection controller 330 or the reprojection controller 420.

Figure 7:
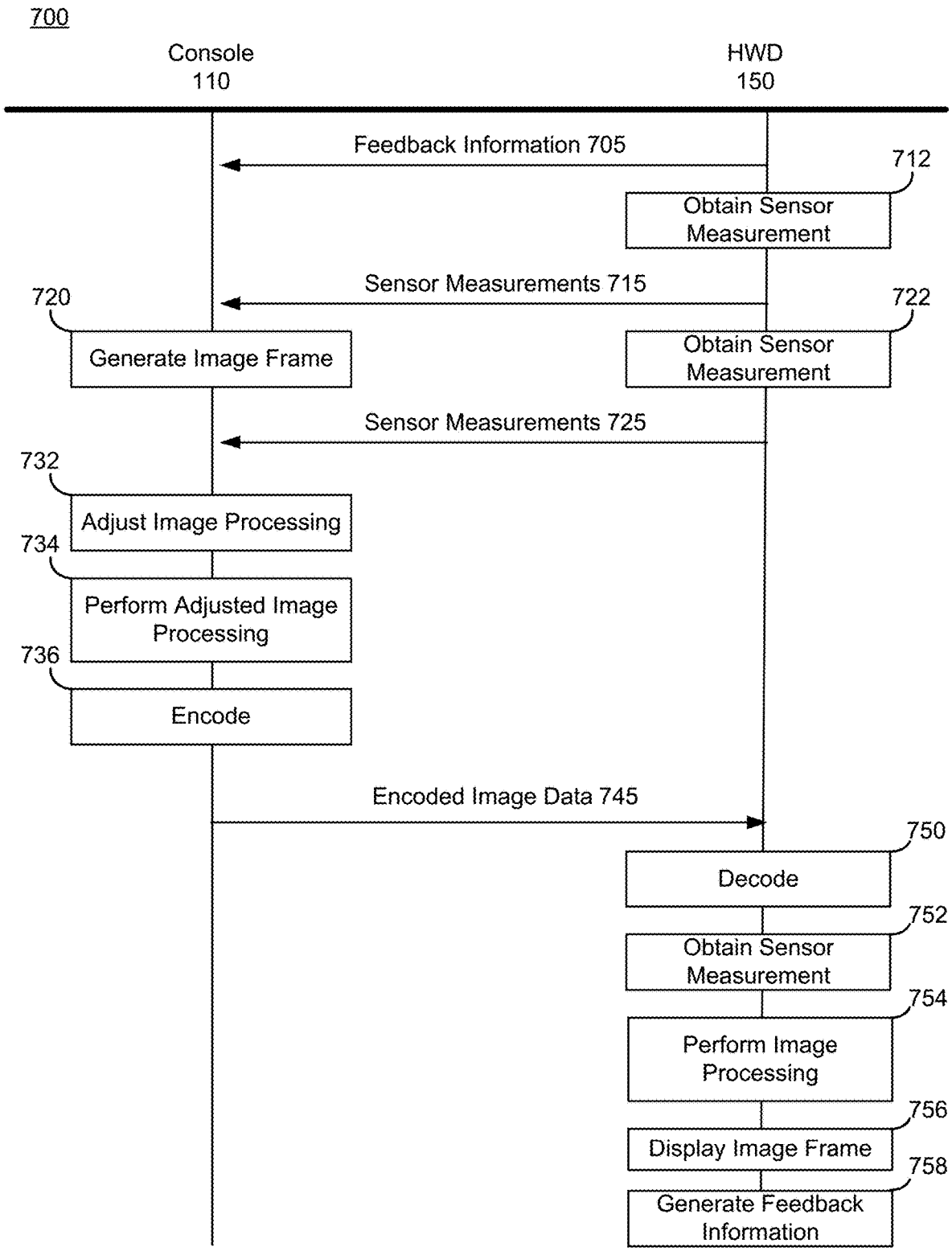
FIG. 7 is an interaction diagram illustrating a process of presenting an artificial reality via an adaptively rate control, according to an example implementation of the present disclosure.

FIG. 7 is an interaction diagram illustrating a process 700 of presenting an artificial reality via an adaptively rate control, according to an example implementation of the present disclosure. In some embodiments, the process 700 is performed by the console 110 and the HWD 150. In some embodiments, the process 700 is performed by other entities. In some embodiments, the process 700 includes more, fewer, or different steps than shown in FIG. 7.

In one approach, the HWD 150 transmits 705 feedback information. The feedback information may indicate a first completion time, at which the HWD 150 completed generating a first image frame for display. According to the feedback information, the console 110 may determine an adjustment to an image processing for generating an image frame that allows the HWD 150 to complete generating another image frame close to a display time.

In one approach, the HWD 150 obtains 712 sensor measurements indicating a location and an orientation of the HWD 150 and/or a gaze direction of a user of the HWD 150 at a first time, and transmits 715 the sensor measurements to the console 110. According to the sensor measurements, the console 110 may generate 720 a second image frame. For example, the console 110 may determine a view of an artificial reality corresponding to the location and the orientation of the HWD 150 and/or the gaze direction of a user of the HWD 150 at the first time, and generate the second image frame including the determined view of the artificial reality.

In one approach, the HWD 150 obtains 722 updated sensor measurements indicating a location and an orientation of the HWD 150 and/or a gaze direction of the user at a second time after the first time, and transmits 725 the sensor measurements to the console 110. According to the feedback information 705, the console 110 may adjust 732 an image processing to be applied to the second image frame from the step 720. For example, the console 110 may compare the first completion time and a first display time, at which the first image frame is displayed by the HWD 150. According to the comparison, the console 110 may determine an amount of time to expedite (hasten) or delay a second completion time, at which the console 110 can complete generating a first updated image frame through an adjusted image processing (e.g., time warp processing and/or reprojection). For example, the console 110 may determine to expedite (hasten) or delay a start time, at which the console 110 can initiate generating a first updated image frame, and/or a completion time, at which the console 110 can complete generating the first updated image frame, such that the HWD 150 can generate an image frame for display within a predetermined time range from a second display time.

In one approach, the console 110 performs 734 the adjusted image processing on the second image frame according to the updated sensor measurements obtained in the step 725. For example, the console 110 performs time warp processing and/or reprojection on the second image frame according to the updated sensor measurements obtained in the step 725 to generate the first updated image frame. For example, the console 110 determines an updated view of the artificial reality corresponding to the updated sensor measurements obtained in the step 725, and determines a difference in the updated view and the view of the artificial reality depicted in the second image frame generated in the step 720. The console 110 may generate a portion of the first updated image frame corresponding to a portion of the updated view not included in the view of the artificial reality depicted in the second image frame. The console 110 may reuse a portion of the second image frame corresponding to a common portion between the updated view and the view of the artificial reality. The console 110 may combine the generated portion and the reused portion to generate the first updated image frame. In one approach, the console 110 encodes 736 the first updated image frame to generate image data encoding the first updated image frame, and transmits 745 the image data to the HWD 150.

In one approach, the HWD 150 receives the image data, and decodes 750 the image data to obtain the first updated image frame. The HWD 150 obtains 752 updated sensor measurements indicating a location and an orientation of the HWD 150 and/or a gaze direction of the user at a third time after the second time. In one approach, according to the updated sensor measurements from the step 752, the HWD 150 performs 754 image processing (e.g., time warp processing and/or reprojection) on the first updated image frame to generate a second updated image frame. The HWD 150 may display 756 the second updated image frame at a second display time. In one aspect, the adjusted image processing in the step 732 according to the feedback information in the step 705 allows or causes the HWD 150 to complete generating the second updated image frame in the step 754 at the second completion time within a predetermined time range (e.g., 0.5 ms to 1.5 ms) from the second display time.

In one approach, the HWD 150 generates 758 additional feedback information. In one approach, the HWD 150 compares the second completion time and the second display time, and generates the additional feedback information according to the comparison. For example, if a difference between the second display time and the second completion time is within the predetermined time range, the HWD 150 may omit or bypass generating the additional feedback information. For example, if a difference between the second display time and the second completion time is beyond the predetermined time range, the HWD 150 may generate 758 the additional feedback information indicating the second completion time. The additional feedback information may allow the console 110 to adjust its image processing, such that the HWD 150 can complete generating an image frame for display within the predetermined range from a third display time.

Figure 8:
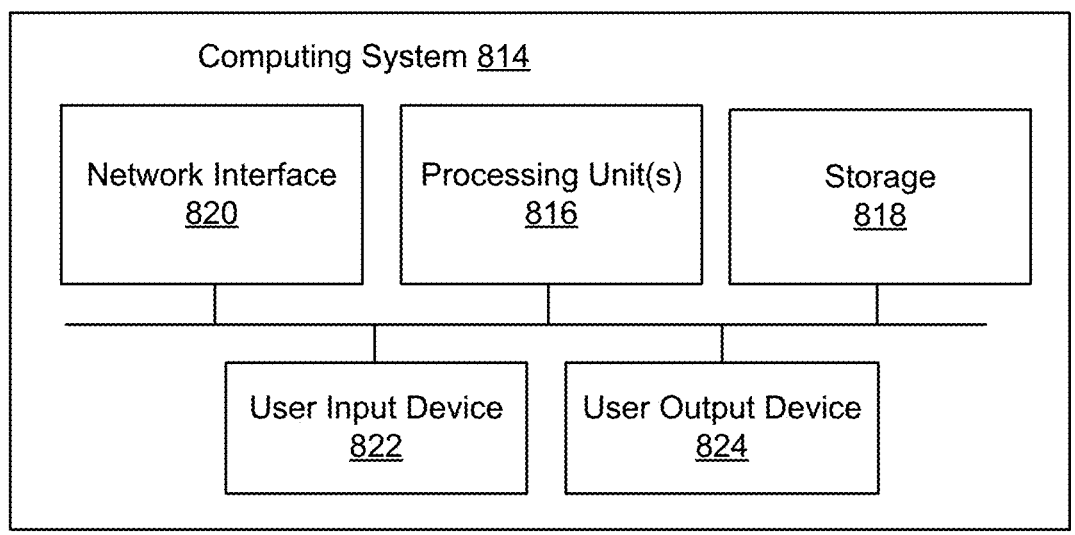
FIG. 8 is a block diagram of a computing environment according to an example implementation of the present disclosure.

Various operations described herein can be implemented on computer systems. FIG. 8 shows a block diagram of a representative computing system 814 usable to implement the present disclosure. In some embodiments, the console 110, the HWD 150 or both of FIG. 1 are implemented by the computing system 814. Computing system 814 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 814 can be implemented to provide VR, AR, MR experience. In some embodiments, the computing system 814 can include conventional computer components such as processors 816, storage device 818, network interface 820, user input device 822, and user output device 824.

Network interface 820 can provide a connection to a wide area network (e.g., the Internet) to which WAN interface of a remote server system is also connected. Network interface 820 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 822 can include any device (or devices) via which a user can provide signals to computing system 814; computing system 814 can interpret the signals as indicative of particular user requests or information. User input device 822 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 824 can include any device via which computing system 814 can provide information to a user. For example, user output device 824 can include a display to display images generated by or delivered to computing system 814. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 824 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 816 can provide various functionality for computing system 814, including any of the functionality described herein as being performed by a server or client, or other functionality associated with message management services.

It should be appreciated that computing system 814 is illustrative and that variations and modifications are possible. Computer systems used in connection with the present disclosure can have other capabilities not specifically described here. Further, while computing system 814 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A head wearable display (HWD) comprising:
one or more processors configured to:
transmit, to a computing device, feedback information indicative of a first completion time, at which the HWD completes generating a first image frame, the first image frame displayed by the HWD;
receive, from the computing device, image data corresponding to a second image frame for display by the HWD at a display time;
generate sensor information indicating at least a location or an orientation of the HWD at a first time between the first completion time and the display time; and
generate a third image frame of a view of an artificial reality corresponding to the sensor information, according to a portion of the second image frame.

2. The HWD of claim 1, wherein the one or more processors are configured to:
determine a second completion time, at which generating the third image frame is completed;
compare the second completion time and the display time; and
transmit, to the computing device, additional feedback information indicating the second completion time, in response to a difference between the display time and the second completion time being less than a first predetermined threshold or larger than a second predetermined threshold.

3. The HWD of claim 2, wherein the one or more processors are configured to:
decode the image data to obtain the second image frame, wherein the second completion time corresponds to a time, at which the HWD completes decoding the image data.

4. The HWD of claim 1, wherein the one or more processors are configured to:
transmit, to the computing device, different sensor information indicating at least a location or an orientation of the HWD at a second time between the first completion time and the first time, the different sensor information causing the computing device to generate the second image frame of a different view of the artificial reality corresponding to the different sensor information.

5. A method comprising:
receiving, by a head wearable display (HWD) from a computing device, image data corresponding to a first image frame of a view of an artificial reality for display;
generating, by the HWD, a second image frame according to the image data;
displaying, by the HWD, the second image frame at a display time;

comparing, by the HWD, the display time with a first completion time at which generating the second image frame is completed; and transmitting, by the HWD to the computing device, feedback information indicating the first completion time, in response to a difference between the display time and the first completion time being less than a first predetermined threshold or larger than a second predetermined threshold, the feedback information causing the computing device to adjust image processing applied to generate the first image frame.

6. The method of claim 5, wherein the feedback information causes the computing device to adjust timing of image processing applied for generating additional image data corresponding to a third image frame of a different view of the artificial reality.

7. The method of claim 6, further comprising:
receiving, by the HWD from the computing device, the additional image data corresponding to the third image frame;
generating, by the HWD, a fourth image frame according to the additional image data, wherein generating the fourth image frame is completed at a second completion time; and
displaying, by the HWD, the fourth image frame at another display time.

8. The method of claim 7, further comprising:
determining, by the HWD, a difference between the another display time and the second completion time being larger than the first predetermined threshold and less than the second predetermined threshold; and
bypassing, by the HWD, transmission of additional feedback information indicating the second completion time to the computing device, in response to the difference between the another display time and the second completion time being larger than the first predetermined threshold and less than the second predetermined threshold.

9. The method of claim 5, further comprising:
generating, by the HWD, first sensor information indicating at least a first location or a first orientation of the HWD at a first time before the display time; and
transmitting, by the HWD, the first sensor information to the computing device, the computing device to generate the image data corresponding to the first image frame according to the first sensor information via the image processing.

10. The method of claim 9, further comprising:
generating, by the HWD, second sensor information indicating at least a second location or a second orientation of the HWD at a second time after the display time; and
transmitting, by the HWD, the second sensor information to the computing device, the computing device to generate additional image data corresponding to a third image frame of a different view of the artificial reality according to the second sensor information and the feedback information via the adjusted image processing.

11. The method of claim 9, further comprising:
generating, by the HWD, second sensor information indicating at least a second location or a second orientation of the HWD at a second time between the first time and the display time, wherein generating the second image frame includes performing image processing on the first image frame, according to the second sensor information.

12. The method of claim 11, wherein the image processing includes at least one of time warp processing or reprojection according to the at least one of the second location or the second orientation of the HWD.

13. A head wearable display (HWD) comprising:
a communication interface configured to receive, from a computing device, image data corresponding to a first image frame of a view of an artificial reality for display;
at least one processor configured to generate a second image frame according to the image data; and
an electronic display configured to display the second image frame at a display time,
wherein the at least one processor is configured to compare the display time, with a first completion time at which generating the second image frame is completed, and
wherein the communication interface is configured to transmit, to the computing device, feedback information indicating the first completion time, in response to a difference between the display time and the first completion time being less than a first predetermined threshold or larger than a second predetermined threshold, the feedback information causing the computing device to adjust image processing applied to generate the first image frame.

14. The HWD of claim 13, wherein the feedback information causes the computing device to adjust timing of image processing applied for generating additional image data corresponding to a third image frame of a different view of the artificial reality.

15. The HWD of claim 14,
wherein the communication interface is configured to receive, from the computing device, the additional image data corresponding to the third image frame,
wherein the processor is configured to generate a fourth image frame according to the additional image data, wherein generating the fourth image frame is completed at a second completion time, and
wherein the electronic display is configured to display the fourth image frame at another display time.

16. The HWD of claim 15,
wherein the at least one processor is configured to determine a difference between the another display time and the second completion time being larger than the first predetermined threshold and less than the second predetermined threshold, and
wherein the communication interface is configured to bypass transmission of additional feedback information indicating the second completion time to the computing device, in response to the difference between the another display time and the second completion time being larger than the first predetermined threshold and less than the second predetermined threshold.

17. The HWD of claim 13, further comprising:
one or more sensors configured to generate first sensor information indicating at least a first location or a first orientation of the HWD at a first time before the display time,
wherein the communication interface is configured to transmit the first sensor information to the computing device, the computing device to generate the image data corresponding to the first image frame according to the first sensor information via the image processing.

18. The HWD of claim 17,
wherein the one or more sensors are configured to generate second sensor information indicating at least a second location or a second orientation of the HWD at a second time after the display time, and wherein the communication interface is configured to transmit the second sensor information to the computing device, the computing device to generate additional image data corresponding to a third image frame of a different view of the artificial reality according to the second sensor information and the feedback information via the adjusted image processing.

19. The HWD of claim 17, wherein the one or more sensors are configured to generate second sensor information indicating at least a second location or a second orientation of the HWD at a second time between the first time and the display time, and wherein the at least one processor is configured to generate the second image frame by performing image processing on the first image frame, according to the second sensor information.

20. The HWD of claim 19, wherein the image processing includes at least one of time warp processing or reprojection according to the at least one of the second location or the second orientation of the HWD.

\* \* \* \* \*